United States Patent [19]
Holtman et al.

[11] Patent Number: 5,590,921
[45] Date of Patent: Jan. 7, 1997

[54] SWELL LATCH ASSEMBLY

[75] Inventors: Eli J. Holtman, Narberth; Edward A. McCormack, Media, both of Pa.

[73] Assignee: Southco, Inc., Concordville, Pa.

[21] Appl. No.: 280,394

[22] Filed: Jul. 25, 1994

Related U.S. Application Data

[63] Continuation-in-part of Ser. No. 88,263, Jul. 7, 1993, Pat. No. 5,368,347.

[51] Int. Cl.⁶ .................................................. B65D 45/30
[52] U.S. Cl. .............................................. 292/257; 292/349
[58] Field of Search ................................. 292/113, 257, 292/258, 247, 288–56, 115, 356, 349; 411/344; 74/548; 403/150

[56] References Cited

U.S. PATENT DOCUMENTS

| | | | |
|---|---|---|---|
| 1,931,850 | 10/1933 | Moore | 292/113 |
| 2,094,779 | 10/1937 | Donaldson | 292/257 X |
| 2,319,504 | 5/1943 | Holman | 292/256 X |
| 2,691,543 | 10/1954 | Morand | 292/256.73 |
| 3,429,199 | 2/1969 | Kenyon | 74/548 |
| 4,540,206 | 9/1985 | Frame et al. | 292/DIG. 49 X |
| 4,729,584 | 3/1988 | Becker, Jr. | 292/257 |
| 5,127,684 | 7/1992 | Klotz et al. | 292/113 |

FOREIGN PATENT DOCUMENTS

480534A1  4/1992  European Pat. Off. .

OTHER PUBLICATIONS

Southco Fasteners Handbook 40 (Southco Inc., Pennsylvania, 1990) Swell Latches, pp. J–2 and J–3.

Southco Fasteners Handbook 40 (Southco Inc., Pennsylvania, 1990) Fractional–Turn Fastener, p. J–12.

*Primary Examiner*—Rodney M. Lindsey
*Attorney, Agent, or Firm*—Paul & Paul

[57] ABSTRACT

A latch assembly is mounted in an aperture formed in a first member for releasably retaining the first member against a corresponding second member and in a latched position. The latch assembly includes a handle which is adapted for pivotal rotation. A shaft is included which is connected with the handle. The handle is adapted to facilitate axial movement of the shaft as the handle is pivotally rotated between open and closed positions. A latch is provided on the shaft which is adapted for axial movement corresponding with movement of the shaft. The latch is adapted to releasably retain the second member in engagement with the first member when the handle is in its closed position. A retaining member is also included in connection with the shaft which is adapted for securing the latch in its mounted position on the shaft. The handle also includes at least one member engaging the shaft which in operation is adapted to provide sufficient drag thereon in order to prevent pivotal rotation of the shaft relative to the handle upon mounting in the aperture in the first member.

27 Claims, 6 Drawing Sheets

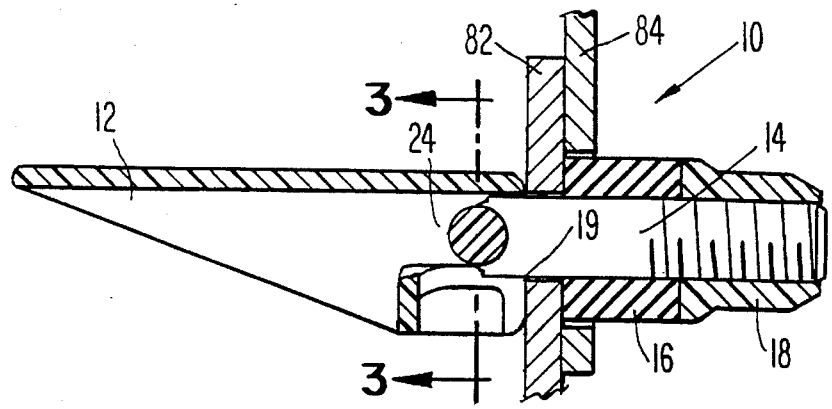
Fig. 1
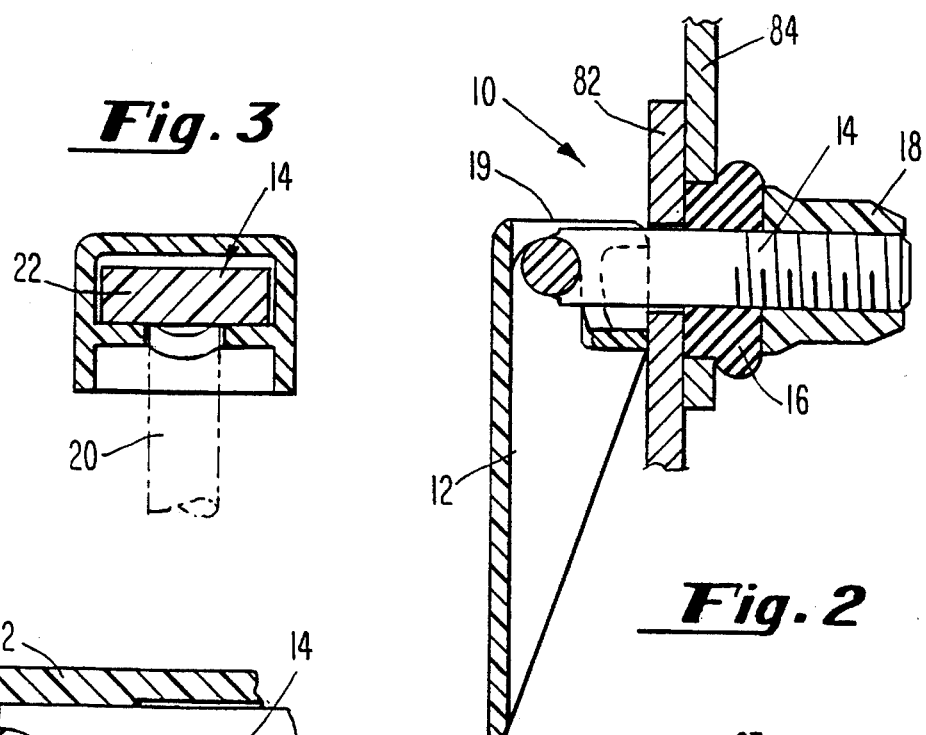
Fig. 3
Fig. 2
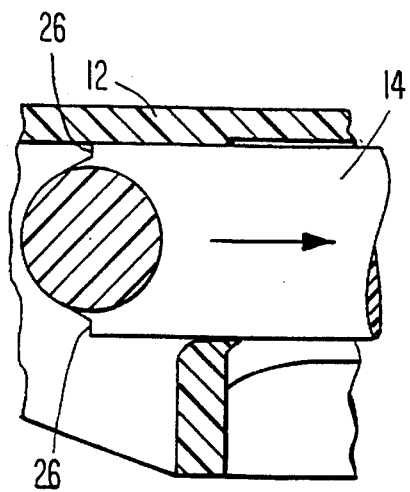
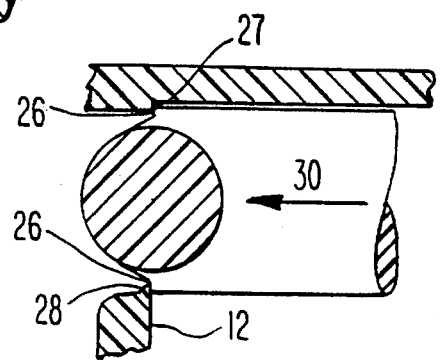
Fig. 4
Fig. 5

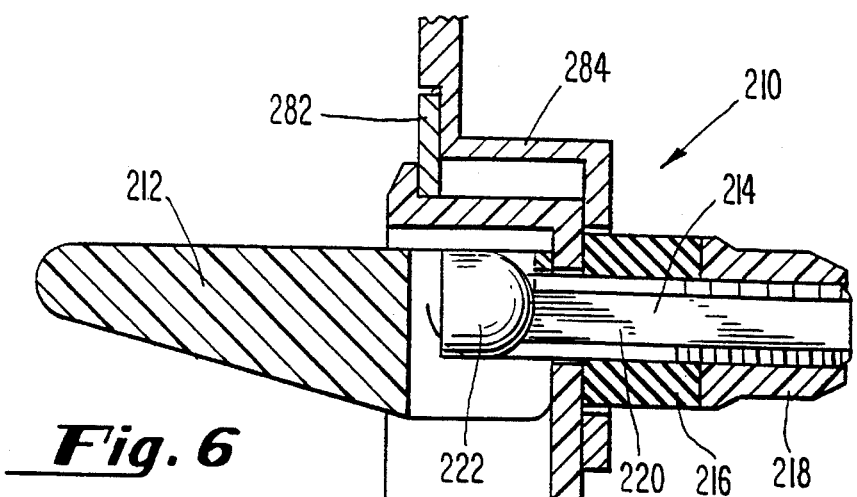
Fig. 6
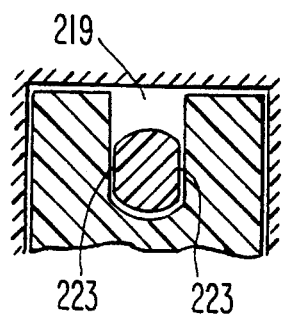
Fig. 8
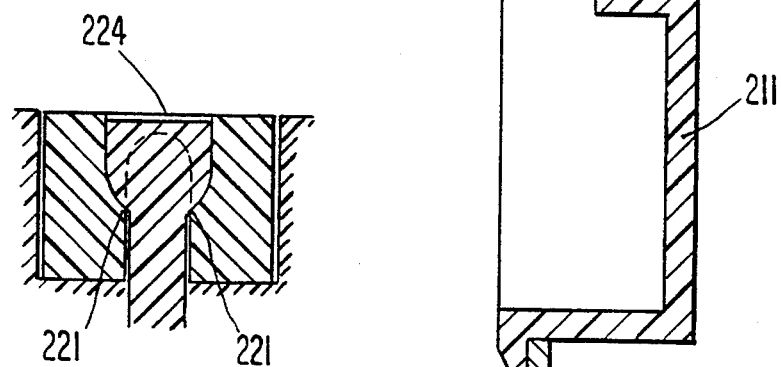
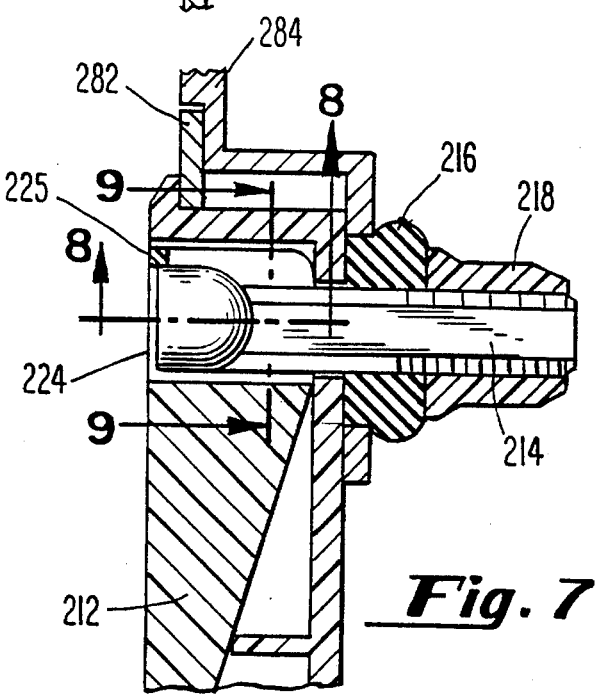
Fig. 9
Fig. 7

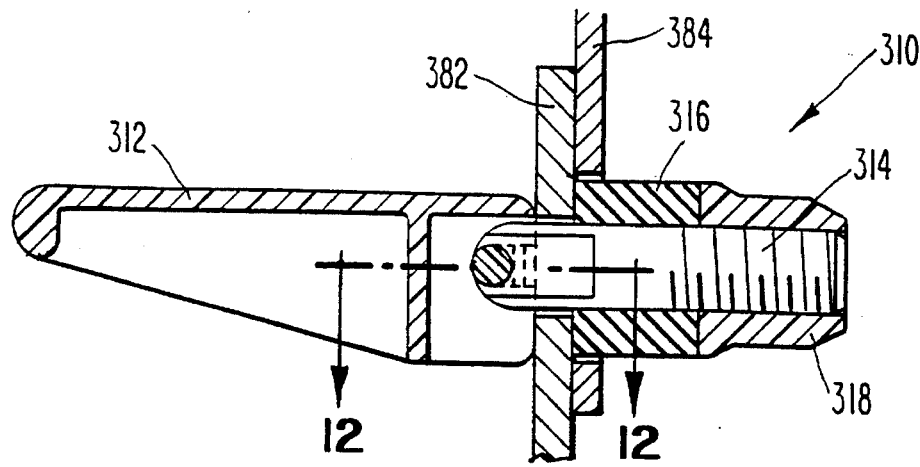
Fig. 10
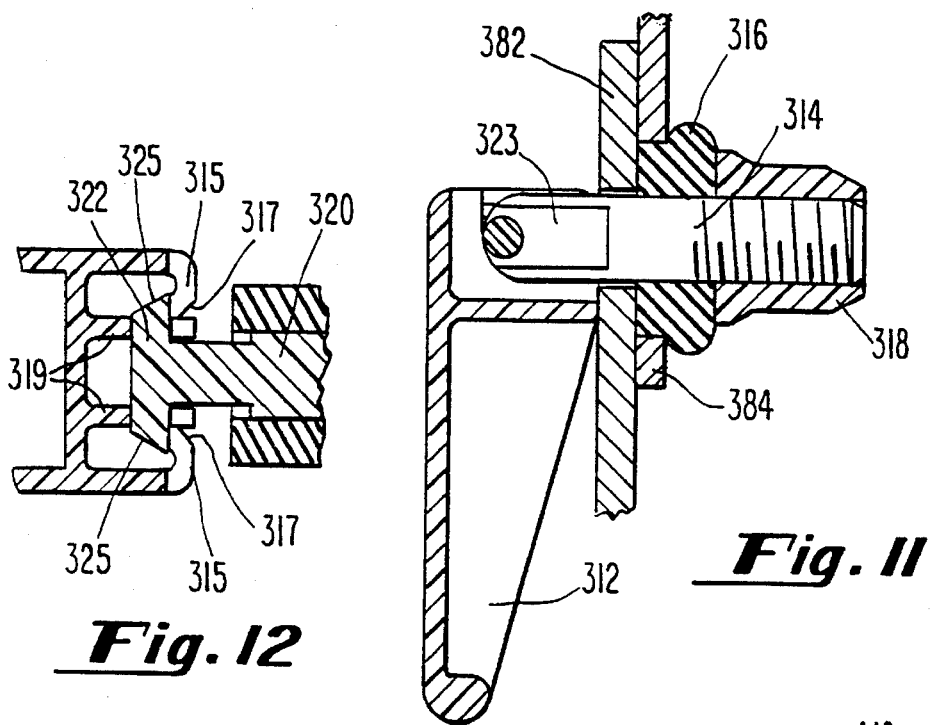
Fig. 12
Fig. 11
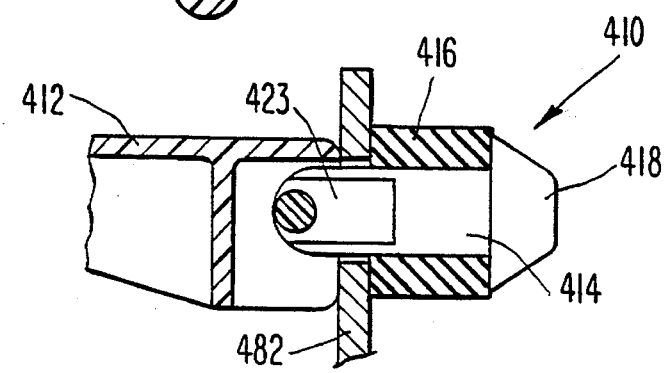
Fig. 13

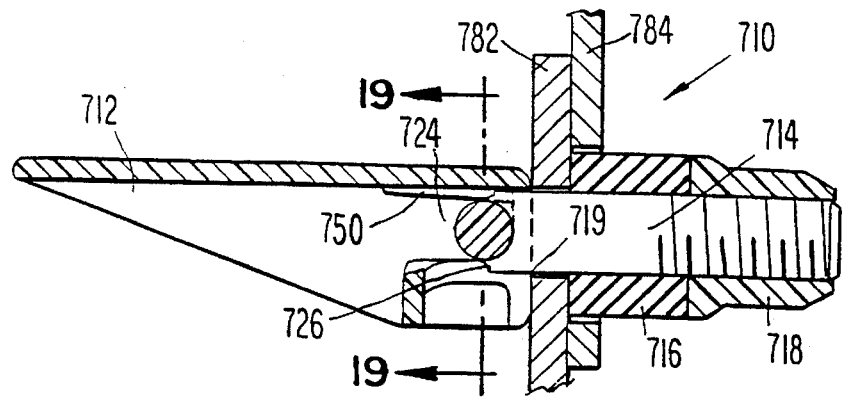
Fig. 17
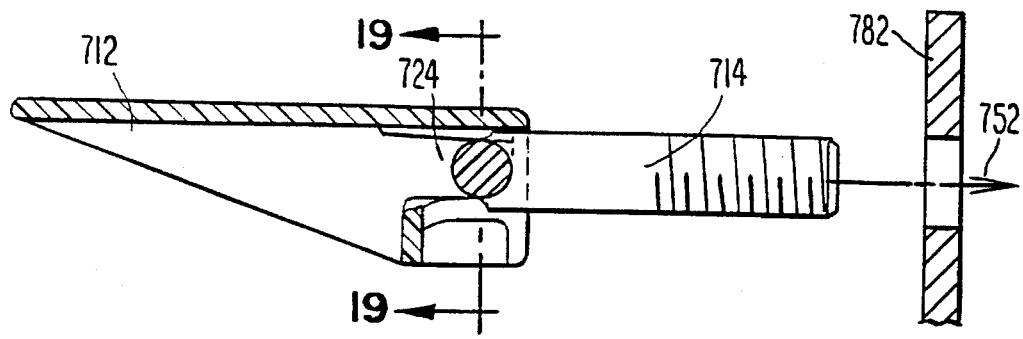
Fig. 17a
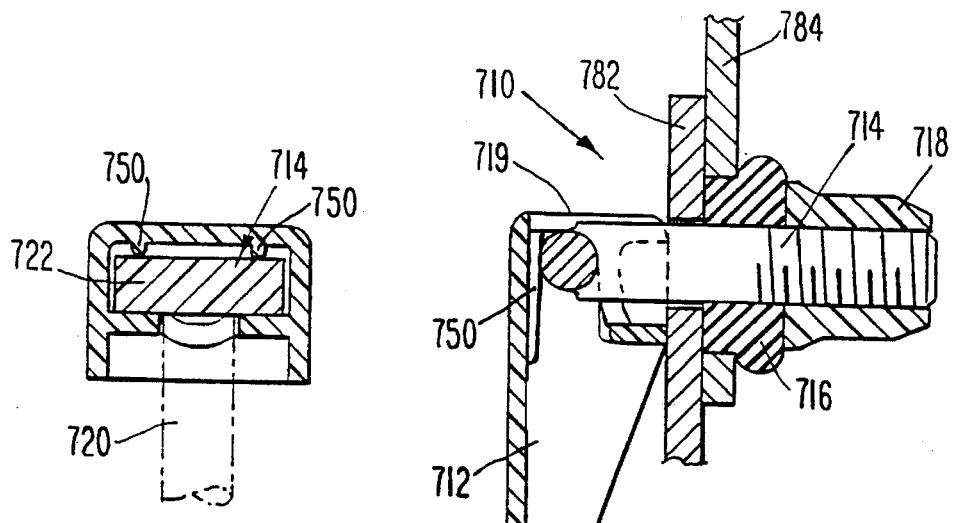
Fig. 19
Fig. 18

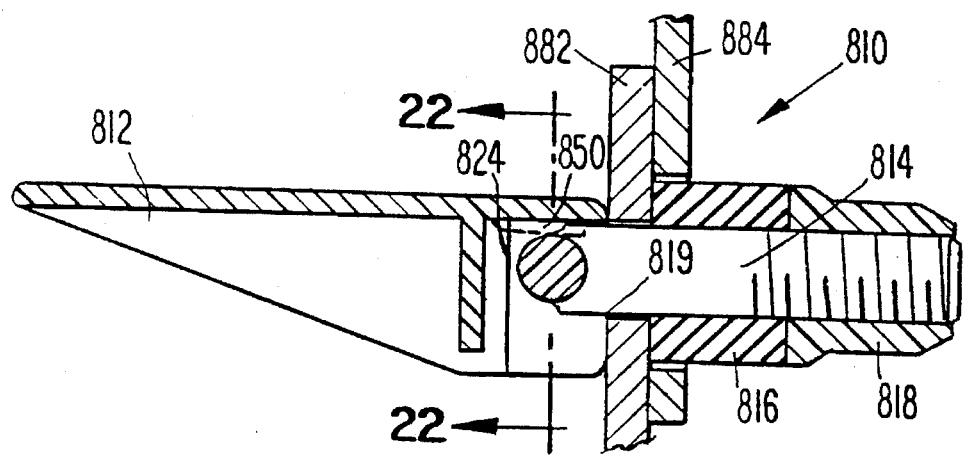
Fig. 20
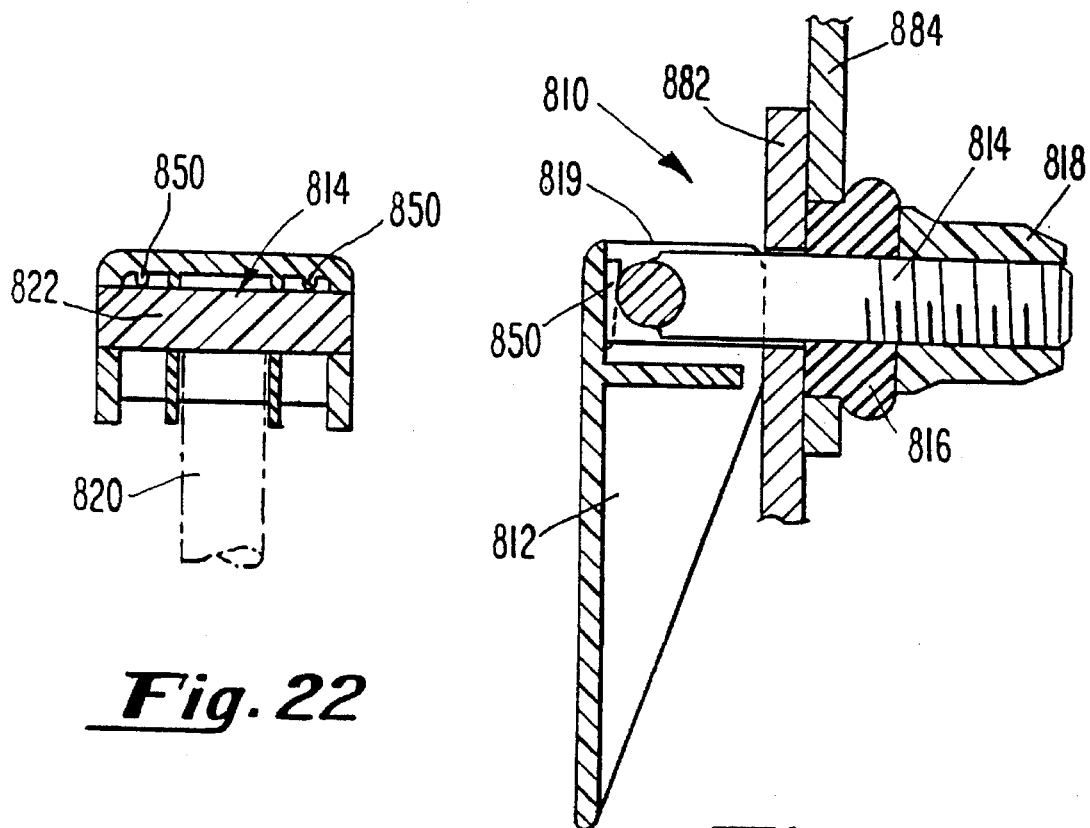
Fig. 22
Fig. 21

SWELL LATCH ASSEMBLY

CROSS-REFERENCE TO RELATED APPLICATIONS

This application is a continuation-in-part of application Ser. No. 08/088,263, filed Jul. 7, 1993 now U.S. Pat. No. 5,368,347.

BACKGROUND OF THE INVENTION

1. Field of the Invention

The present invention relates generally to latching devices and more particularly to swell latch assemblies adapted for fastening hinged doors, panels and the like.

2. Brief Description of the Prior Art

Presently, there are a number of swell latch assemblies known in the art which are operable for securing two panels or a panel against a corresponding frame. Generally, latches of this type are mounted proximate the edges of the first panel and on engagement are adapted to compress the first panel against the corresponding second panel or frame and into a latched position. In such devices, a handle is provided pivotally connected by a pin to a shaft which is inserted through an aperture in the panel member. In instances where flush mounting of the latch is desired, the handle is also connected to a housing which is then installed within the aperture in the panel member. A rubber bushing is also provided mounted on the shaft and secured by a nut. The nut is receivable onto a threaded section of the shaft for securing the bushing in the mounted position. In operation, the rubber bushing when unlatched can be passed through a configured hole formed in the corresponding panel or frame. On latching, pivotal movement of the handle from an opened to a closed position corresponds with axial movement of the shaft. This axial movement of the shaft works to compress and deform or "swell" the rubber bushing so as to engage an inner surface of the corresponding panel member or frame and into the latched position. This type of latch had been used originally for sealing of thermos bottles. A riveted on washer instead of a nut secured the bushing.

However, one problem which has been observed is that manufacture of such prior art latches involves a relatively long and costly procedure. In particular, five separate components are required for assembly of such devices. Furthermore, the procedure of installing the pivot pin in order for connecting the handle to the shaft and housing further increases the time required for manufacture.

Another problem has been encountered in mounting of such latches in their respective panel members. For instance, with mounting of swell latches, the shaft, after it has been connected with the handle, is fed through the mounting aperture in the panel member by an installer who holds the handle in one hand and with the other hand places the bushing and the nut onto the shaft. However, a problem is that the shaft during such installation procedure can, and oftentimes does, rotate freely in relation to the handle which inhibits the installation process. In particular, rotation of the shaft operates to fluctuate its position relative to the panel aperture, for example, similar to the process of inserting thread through the head of a sewing needle when the thread or sewing needle are moved.

Because of these and other difficulties associated with swell latch assemblies presently employed, there now exists a need for a simple and economical swell latch assembly.

SUMMARY OF THE INVENTION

The present invention provides a latch assembly which is adapted for being mounted in an aperture formed in a first member for releasably retaining the first member against a corresponding second member and in a latched position. For this purpose, the latch assembly according to the present invention includes a handle member which is adapted for pivotal rotation. A shaft is also included which is in pivotal engagement with the handle member. The handle member is adapted to facilitate axial movement of the shaft as the handle member is pivotally rotated between open and closed positions. A latching means is also included which is associated with the shaft. The latching means is adapted for axial movement corresponding with movement of the shaft. The latching means releasably retains the second member in engagement with the first member when the handle member is in the closed position. A retaining means is also provided associated with the shaft which is adapted for securing the latching means in its position in association with the shaft. The handle member also includes means engaging the shaft adapted for providing sufficient drag thereon in order to prevent pivotal rotation of the shaft relative to the handle member on mounting. In particular, an operator when the shaft is in engagement with the handle member mounts the device by inserting the shaft through the aperture of the first member.

In accordance with the present invention, an object is to provide a swell latch assembly in which the parts are few and which provides for a simple installation process.

It is another object of the present invention to provide a swell latch assembly which is inexpensive to construct and sufficiently simple in design and operation.

These and other objects of the present invention will become more readily apparent when taken into consideration with the following description and the attached drawings.

BRIEF DESCRIPTION OF THE DRAWINGS

FIG. 1 is a sectional elevational view of a swell latch assembly according to a first preferred embodiment of the present invention, the swell latch assembly shown in an unlatched position.

FIG. 2 is a sectional elevational view of the swell latch assembly of FIG. 1 shown in a latched position.

FIG. 3 is a sectional plan view of the swell latch assembly of FIG. 1 taken along the line 3—3.

FIG. 4 is an enlarged sectional elevational view of the swell latch assembly of FIG. 1 showing installation of a shaft member.

FIG. 5 is an enlarged sectional elevational view of the swell latch assembly of FIG. 4 showing containment of the shaft member within the device.

FIG. 6 is a sectional elevational view of a swell latch assembly according to a second preferred embodiment of the present invention, the swell latch assembly shown in an unlatched position.

FIG. 7 is a sectional elevational view of the swell latch assembly of FIG. 6 shown in a latched position.

FIG. 8 is a sectional rear elevational view of the swell latch assembly of FIG. 7 taken along the line 8—8.

FIG. 9 is a sectional plan view of the swell latch assembly of FIG. 7 taken along the line 9—9.

FIG. 10 is a sectional elevational view of a swell latch assembly according to a third preferred embodiment of the present invention, the swell latch assembly shown in an unlatched position.

FIG. 11 is a sectional elevational view of a swell latch assembly of FIG. 10 shown in a latched position.

FIG. 12 is a sectional front elevational view of the swell latch assembly of FIG. 10 taken along the line 12—12.

FIG. 13 is a sectional elevational view of a swell latch assembly according to a fourth embodiment of the present invention.

FIG. 17 is a sectional elevational view of a swell latch assembly according to a seventh embodiment of the present invention, the swell latch assembly shown in an unlatched position.

FIG. 17a is a sectional elevational view of the swell latch assembly of FIG. 17 showing a shaft connected to a handle member and being inserted through an aperture provided in a panel member for mounting.

FIG. 18 is a sectional elevational view of the swell latch assembly of FIG. 17 shown in a latched position.

FIG. 19 is a sectional plan view of the swell latch assembly of FIG. 17 taken along the line 19—19.

FIG. 20 is a sectional elevational view of a swell latch assembly according to an eighth embodiment of the present invention, the swell latch assembly shown in an unlatched position.

FIG. 21 is a sectional elevational view of the swell latch assembly of FIG. 20 shown in a latched position.

FIG. 22 is a sectional plan view of the swell latch assembly of FIG. 20 taken along the line 22—22.

DETAILED DESCRIPTION OF THE PREFERRED EMBODIMENTS

Figure 14:
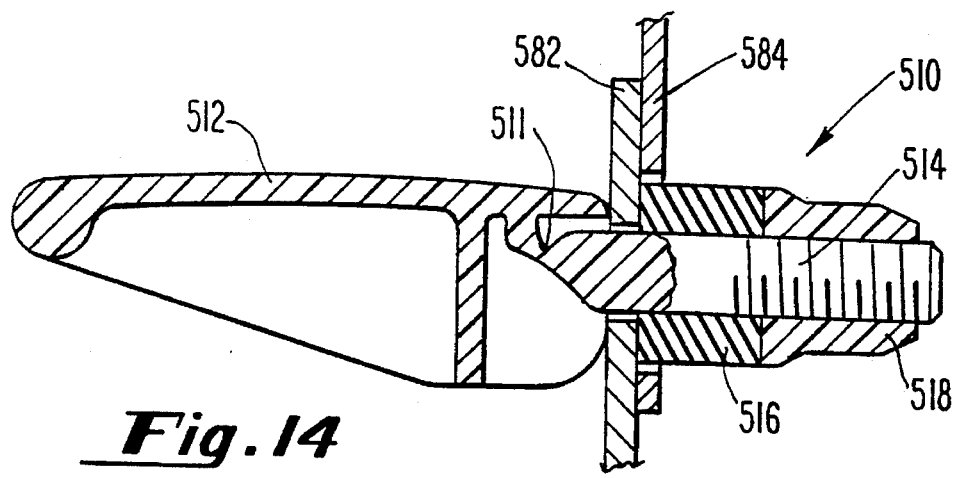
FIG. 14 is a sectional elevational view of a swell latch assembly according to a fifth embodiment of the present invention, the swell latch assembly shown in an unlatched position.

Referring now to the drawings in detail, wherein like reference numerals indicate like elements throughout the several views, there is shown in FIG. 1 a swell latch assembly according to a first preferred embodiment of the present invention. The swell latch assembly 10 as illustrated in FIG. 1 is in an unlatched position and mounted in an aperture formed through a section of a first member 82. The first member 82 as shown is in engagement with a section of a second panel member 84. The first panel member 82 according to the present invention can comprise a door, panel or the like which is adapted to engage the second panel member 84 in a closed position in order for enclosing various equipment which may be installed therein (not shown). The second member 84 of the present invention can comprise a corresponding panel or a frame structure depending on the application of the swell latch assembly 10. The composition of the first and second members 82 and 84 can be manufactured from any suitable type of material which will provide a rigid support structure, such as wood, plastic or sheet metal. As illustrated in FIGS. 1 through 5, the major components of the swell latch assembly 10 of the present invention are a handle means 12, a shaft means 14, a latching means comprising a bushing means 16 and a retaining means 18. The handle means 12, as illustrated, is pivotally connected to the shaft means 14. As best illustrated in FIG. 3, the shaft means 14 comprises a one-piece, integral member preferably comprised of thermoplastic, however other suitable materials can also be used. The shaft means 14 as shown comprises a substantially T-shaped member which defines a generally elongated first portion 20 substantially perpendicular to a generally elongated second portion 22. The first portion 20 extends through a slot 19 formed in the front of the handle means 12, proximate the first member 82. The second portion 22 as shown preferably is received within the handle means 12 with its two end portions being adjacent an inner surface of the handle means 12 on installation, however such is not required. The handle means 12 as disclosed is preferably manufactured of plastic, however other materials can also be utilized for this same purpose. As best illustrated in FIGS. 4 and 5, the shaft means 14 further includes at least one shoulder means thereon, preferably the pair of shoulder means 26 are provided. The shoulder means 26 as shown is adapted to engage at least one generally ramped, flexible protruding member 28 and step 27 provided in the handle means 12 as will be described in detail below. Furthermore, as shown in FIGS. 1 and 2, the shaft means 14 is included with a threaded portion thereon adapted for receiving the retaining means 18. The retaining means 18 preferably comprises a nut or similar member or the like capable of being mounted on the threaded shaft means 14 for retaining the position of the bushing means 16. The bushing means 16 as shown comprises a cylindrical member, preferably manufactured of rubber or other suitable elastic material.

As best illustrated in FIGS. 1, 3 and 4, on installation, the shaft means 14 is received from the rear of the handle means 12, with the first portion 19 in front, through an opening 24 formed in the handle means 12 in order for pivotally connecting the shaft means 14 and the handle means 12 in the position illustrated in FIG. 3. Upon installation, the flexible, protruding member 28 of the handle means 12 is flexed forwardly by the outer surface of the shaft means 14 as shown in FIG. 4. After the shaft means 14 passes over the flexible protruding member 28, the flexible protruding member 28 flexes back to its original ramped position. In this configuration, the flexible protruding member 28 and step 27 as shown in FIG. 5 are adapted to retain the shaft means 14 within the handle means 12 by contacting the shoulder means 26 whenever the shaft means 14 is moved in the direction of arrow 30.

Following installation as described above, the shaft means 14 is inserted through the aperture in the first member 82 as shown in FIG. 1. In this position, the bushing means 16 is then mounted on the shaft means 14 and secured by the retaining means 18. Retaining means 18 is adjustable on the threaded portion of the shaft means 14 so as to position both the bushing means 16 in contact with an inner surface of the first member 82 and the handle means in contact with an outer surface of the first member 82.

In operation, the first member 82 is brought into contact with the second member 84 for closing the two members. As shown in FIG. 1, the second member 84 is provided with an aperture therethrough in order to allow passage of the bushing means 16 therethrough as the first and second members 82 and 84 are closed together. After which, the handle means 12 is pivotally rotated about the shaft means 14, as it is passed through the slot 19 therein, from an opened position illustrated in FIG. 1, to a closed position shown in FIG. 2. The pivotal rotation of the handle means 12 from the opened to the closed position corresponds with axial movement outwardly of the shaft means 14 in the direction of the first member 82. The axial movement of the shaft means 14 causes the bushing means 16 captured between the panel member 82 and retaining means 18 to compress along its axis and swell in its diameter which works to secure the second panel member 84 in its closed position shown in FIG. 2.

In FIGS. 6 though 8 is illustrated a second embodiment of the swell latch assembly according to the present invention. In this second embodiment, portions identical to that identified in relation to the first embodiment are designated with a corresponding number beginning with the number 200. As illustrated, the swell latch assembly 210, similar to that described above, includes a handle means 212, shaft means 214, bushing means 216 and retaining means 218. In addition, a housing means 211 is also shown. The shaft means 214 as described in this second embodiment comprises a generally elongated first portion 220 in connection with a substantially hemispherical second portion 222. The shaft means 214 as shown is receivable on installation through an aperture 224 formed through the housing means 212. When installed, the substantially hemispherical second portion 222 of the shaft means 214 is in engagement with at least one seating member provided in the handle means 212, preferably the two seating members 221 as shown are provided. In the present embodiment, the substantially hemispherical second portion 222 is positioned offset on the substantially elongated first portion 220 toward the front of the housing means 212 when installed.

Similar to that described above, the swell latch assembly 210 is provided within the panel member 282 and latched into the position illustrated in FIG. 7. In this embodiment, the housing means 211 is provided which is shown mounted in the panel member 282. The housing means 211 as shown includes flange means adapted for engaging the panel member 282, an aperture therethrough for receiving the shaft means 214, and an opening therein defining a cavity adapted for receiving the handle means 212. As shown in FIG. 7, the handle means 212 when in its closed position is adapted to have its outer surface contiguous with an outer surface of the flange means, thus providing a flush mounting of the device. A bracket or other member can also be included for retaining the position of the housing means 211 within the panel member 282.

During operation, the pivotal rotation of the handle means 212 is guided by a slot 219 provided within the front portion thereof proximate the panel member 282 and is limited by the bridge 225 disposed thereon. The offset position of the substantially hemispherical second portion 222 permits the handle means 212 to pivot through an extended range prior to contacting the bridge 225. In the present embodiment, the handle means 212 is adapted to pivot through approximately 80° before the shaft means 214 will engage the bridge 225 thereon, however other amounts of rotation can also be provided. Furthermore, the offset configuration of the substantially hemispherical second portion 222 of the shaft means 214 operates to maintain the axial position of the shaft means 214 relative to the handle means 212 during operation.

In FIGS. 10 through 12 is shown a third embodiment of the present invention. In this embodiment, portions corresponding with the earlier two embodiments are designated by the number 300. In this embodiment, the latch assembly 310 includes a handle means 312, a shaft means 314, a bushing means 316 and a retaining means 318. In this embodiment, the shaft means 314 is adapted to be snap-fit within the handle means 312 for installation thereof. The shaft means 314, similar to that described in relation to the first embodiment, comprises a substantially T-shaped member defining a generally elongated first portion 320 substantially perpendicular to a generally elongated second portion 322. Preferably, the shaft means 314 is manufactured of thermoplastic, however other suitable materials can also be used. The generally elongated second portion 322 is included with chamfer means thereon comprising at least one beveled edge on an end thereof for engaging the handle means 312, preferably each of the two ends of the second portion 322 are formed having a beveled edge 325 disposed thereon. On installation, the beveled edges 325 of the second portion 322 are adapted to engage cantilever means provided in the handle means 312. The cantilever means of the present embodiment comprises at least one but preferably two flexible cantilevered gates 315, with each having a beveled edge 317 thereon adapted for receiving the beveled edges 325 of the generally elongated second portion 322. On installation, the cantilever gates 315 are flexed backwards by the beveled edges 325. Once installed, the gates 315 flex back to their original position for retaining the generally elongated second portion 322 of the shaft means 314 therein. The handle means 312 is further provided with a pair of bearing seats 319 provided therein which are adapted to support the generally elongated second portion 322 during operation of the device shown in FIG. 12.

In FIG. 13 is shown a fourth embodiment of the swell latch assembly according to the present invention. In this embodiment, the portions corresponding with the earlier embodiments are designated with the number 400. This present embodiment is identical to that described in relation to the third embodiment of the present invention above, however the shaft means 414 and retaining means 418 as described in the third embodiment are substituted by an integral one-piece cone-nosed retaining means 418/shaft means 414. In this embodiment, the bushing means 416 prior to assembly is installed on the shaft means 414 by forcing it over either the generally elongated second portion 422 or cone-nosed portion thereof. During installation, the integral retaining means 418/shaft means 414 is inserted from the inner side of the panel member 482 through the aperture thereof, after which the handle means 412 is forced against the second portion 422 of the shaft means 414 for installation. In this embodiment, the aperture through panel member 482 is preferably configured including a substantially circular portion to accommodate the cone-nosed portion and two adjoining smaller substantially rectangular portions to allow passage of the two ends of the second portion of the shaft means (not shown).

Figure 15:
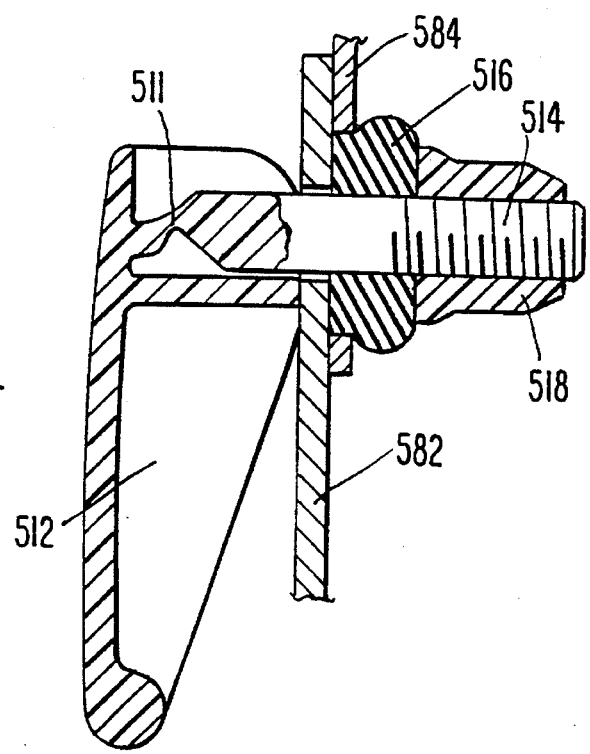
FIG. 15 is a sectional elevational view of the swell latch assembly of FIG. 14 shown in a latched position.

In FIGS. 14 and 15 is illustrated a fifth embodiment of the present invention. As described in this embodiment, the portions corresponding to the earlier embodiments are designated with a number 500. In this embodiment, the swell latch assembly 510 comprises three components, including an integral, one-piece handle means 512/shaft means 514, a bushing means 516 and a retaining means 518. The shaft means 514 as illustrated is cut or otherwise formed in connection with and extending from the handle means 512 which provides a living hinge. The living hinge allows the handle means 512 to pivot about a hinge means 511 relative to the shaft means 514. Preferably, the integral handle means 512/shaft means 514 is manufactured of polypropylene, although other suitable materials can also be used for this purpose. Upon installation of the swell latch assembly 510, the integral handle means 512/shaft means 514 combination is inserted through the aperture in the panel 582, afterwhich the bushing means 516 and retaining means 518 are mounted from the inner side thereof, similar to that described in relation to the first two embodiments of the present invention.

Figure 16:
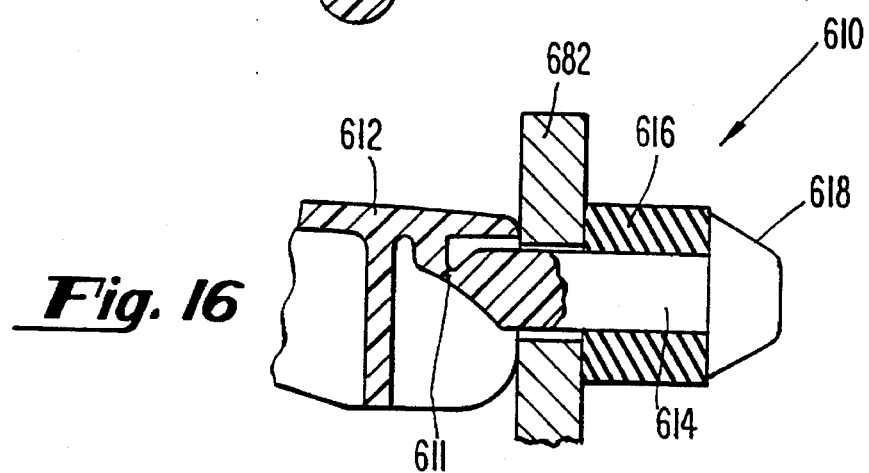
FIG. 16 is a sectional elevational view of a swell latch assembly according to a sixth embodiment of the present invention.

In FIG. 16 is shown a sixth embodiment of the swell latch assembly according to the present invention. In this embodiment, the portions which are identical to that described above are designated with the number 600. The swell latch assembly 610 of the present embodiment is identical to that described above in relation to the fifth embodiment, except that two components are provided rather than the three disclosed in relation to the swell latch assembly 510. In particular, the latch assembly 610 as disclosed comprises an integral one-piece cone-nosed retaining member 618/shaft means 614/handle means 612 combination and a bushing means 616. The configuration of the cone-nosed retaining means 618 portion is similar to that described in relation to the fourth embodiment of the present invention previously described. In this embodiment, the bushing means 616 is forced over the cone-nosed retaining member 618 prior to installation.

In order to accommodate installation of the swell latch assembly 610, a keyhole shaped aperture is provided formed in the panel member 682 (not shown). In particular, the cone-nosed retaining means 618 is inserted through the larger diameter of the key hole aperture and thereafter slid into the smaller portion for accommodating installation thereof.

FIGS. 17–19 illustrate a seventh embodiment of the swell latch assembly according to the present invention. In this embodiment, portions corresponding to that earlier described are designated by the same numbering arrangement, however beginning with the number 700. The swell latch assembly 710 of the present embodiment substantially corresponds with that previously shown and described in relation to the first embodiment of the present invention illustrated in FIGS. 1–5. In particular, the major components of the latch assembly 710 include a handle member 712, a shaft 714, a latching means comprising a bushing 716 and a retaining means 718. The configuration of the shaft 714 corresponds to that of the first embodiment defining a substantially T-shaped member of a generally elongated first portion substantially perpendicular to a generally elongated second portion. In addition, the shaft 714 is installable with the handle member 712 in the same manner as the shaft 14. Further, the shaft 714 also includes at least one, but preferably a pair of shoulder means or bosses 726 thereon which are adapted to engage at least one shoulder member disposed in the handle, which comprises the generally ramped, flexible protruding member and step as described earlier. The difference from the first embodiment resides in the handle member 712 which also includes means engaging the shaft 714 for providing sufficient drag thereon to prevent pivotal rotation of the shaft 714 relative to the handle member 712 upon mounting. In accordance with the present invention, the means engaging the shaft 714 comprises at least one member extending outward from the inner surface of the handle 712. In the present embodiment, as best illustrated in FIGS. 17 and 19, preferably a pair of members comprising substantially elongated bosses 750 are provided, however, it should be understood that other configurations can also be used for this same purpose. As illustrated in the Figures, the bosses 750 in the present embodiment are in engagement with the generally elongated second portion 722 of the shaft 714 when mounted within the handle member 712. The bosses 750 are, in turn, preferably provided extending from the inner surface of the top wall of the handle member 712 proximate the front end thereof. In operation, the bosses 750 are adapted to provide sufficient frictional resistance to the second portion 722 in order to prevent pivotal rotation of the shaft 714 upon mounting of the device 710 in the aperture of the panel member 782. In particular, as best illustrated in FIG. 17a, the shaft 714 subsequent to installation with the handle member 712 is inserted in the direction of arrow 752 through the aperture of the first member 782 for mounting. In this regard, the operation of the bosses 750 provides sufficient drag to the shaft 714 in order to prevent rotation thereof relative to the handle 712 due to the weight of the shaft 714. As such, the shaft 714 due to the bosses 750 will be retained in a position extending outward from the front wall of the handle 712 which facilitates installation in the aperture of the panel member 782. Further, the size of the bosses 750, number or amount of extension thereof from the inner surface of the handle 712 can also be varied depending on the desired amount of frictional resistance or drag to be imposed on the shaft 714. For example, the distance of extension should be sufficient in order to retain shaft 714 in a position extending outward from the front wall of the handle 712. For instance, in some circumstances, the weight of the shaft 714 could be varied depending on the desired size of the shaft 714. Further, in other instances, the retaining means 718 and/or latching means 716 could be mounted to the shaft 714 prior to insertion through the panel 782, and thus the frictional resistance provided by the bosses 750 should be sufficient for retaining the shaft 714 in its extended position even with the additional weight of retaining means 718 and/or the latching means 716.

In FIGS. 20–22 is illustrated an eighth embodiment of the swell latch assembly according to the present invention. In this embodiment, the portions corresponding to that earlier described are designated with the same numbering system beginning with the number 800. The swell latch assembly 810 according to the present invention is similar to that described above in relation to the seventh embodiment in that the bosses 850 are provided for engaging the second portion 822 of the shaft 814. The difference resides in the arrangement of the shaft 814 relative to the handle 812. In particular, as best illustrated in FIG. 22, the second portion of the shaft 822 is provided disposed within the side walls of the handle 812. For this purpose, the handle 812 is provided with a pair of diametrically opposing apertures therethrough which are adapted for receiving the second shaft portion 822 for rotational movement therein as is shown in FIG. 22. The second shaft portion 822 in this embodiment can comprise a separate pin member mounted to or disposed in the generally elongated first portion 820 or otherwise can be provided integrally connected to the first portion 820 providing a one-piece shaft arrangement which has the ends of the pin member received within the opposing apertures in the handle 12, as is shown. However, it should be understood that the operation of the bosses 850 relative to the shaft 814 is identical to that described above as to the seventh embodiment.

In view of the foregoing, it will be understood that an advantage of the present invention is to provide a latch assembly which is adapted to prevent or otherwise inhibit rotational movement of the shaft relative to the handle during mounting of the device. In particular, the bosses 750 and 850 described above operate to provide frictional resistance or drag to the second portions 722 and 822 of the shaft, which is sufficient to prevent rotation of the shaft during mounting in the aperture provided through the first panel member. Further, while the seventh and eighth embodiments of the present invention are described in relation to a latch of the swell type, it should be understood that the foregoing can have application with other types of latch assemblies as well, in particular where mounting of a shaft connected to a handle is provided within a panel aperture, such as a pawl latch or other latch structure.

The swell latch assembly of the present invention possesses several other advantages over conventional swell latch assemblies. A particular advantage is that the present invention provides an integral one-piece shaft/pivot pin combination which facilitates a quicker and less expensive assembly process since fewer parts are required. In addition, the integral one-piece shaft means of the present invention provides for simple slip-fit installation within the latch structure. In particular, the shaft means 14 described in relation to the first embodiment is received through the aperture 24 formed in the handle 12 for installation, the shaft means 214 disclosed in relation to the second embodiment is received through the aperture 224 formed in the handle means 212, the handle means 314 and 414 described in relation to the third and fourth embodiments, respectively, are adapted to be snap-fit within the handle means thereof and the shaft means 514 and 614 described in relation to the fifth and sixth embodiments of the present invention, respectively, is integrally provided connected directly to the handle means of the device. Rather, in prior art devices, manual installation of the required pivot pin member provides for a rather tedious and time consuming process in many instances. In addition, the structure of the shaft means 14 disclosed in relation to the first embodiment of the present invention further facilitates a quicker assembly of the device. In particular, as illustrated in FIGS. 1 and 4, due to the two shoulder means 26, the shaft means 14 is bilaterally symmetrical about a plane defined by a central axis of rotation extending through both the generally elongated first and second portions 20 and 22, respectively. As such, the shaft means 14 can be installed within the handle 12 in either of two possible orientations. This operates to "fool-proof" manual assembly of the device and also simplifies automated assembly should such be utilized therefor.

In addition, the present invention provides another advantage over the prior art in that the shoulder means 26 of the shaft means 14 and flexible protruding member 28 and step 27 of the handle means 12, as disclosed in the first embodiment of the present invention, operates to retain the shaft means within the handle means, once installed, during shipment of the device. In particular, the swell latch as disclosed in the first embodiment may be partially assembled prior to shipment. Specifically, in these instances, the bushing means 16 and retaining means 18 are later assembled to the shaft means 14 and handle means 12 following installation within the panel member 82. In this regard, the swell latch assembly 10 incorporates the flexible protruding member 28 and step 27 which operate as an interference by engaging the shoulder means 26 during movement of the shaft means 14 to prevent possible disassembly of the device.

Further, the shaft means 314 and 315 disclosed in relation to the third and fourth embodiments, respectively, are inserted through the aperture from the inner side of the first member and the handle means is then snap-fit against the shaft means for installation. This provides for a quicker assembly as the shaft means engages the front face of the handle means for installation of the device.

Another advantage of the present invention over prior art devices is that the integral cone-nosed retaining means incorporates an angle at the base thereof which operates to prevent the bushing means from possibly riding up and over the retaining means under a latching load when in a latched position.

It will be recognized by those skilled in the art that changes may be made by the above-described embodiments of the invention without departing from the broad inventive concepts thereof. For example, the housing means 211 which is disclosed in the second embodiment can also be utilized with the other embodiments of this invention whenever flush mounting of the latch is desired. Furthermore, as to the sixth embodiment of the present invention, a corresponding keyhole shaped aperture would be provided through the housing means when adapted for flush mounting. In addition, as to the second, third and fourth embodiments of the present invention, the shaft means disclosed therein can also be formed having at least one, or a pair of flat portions 223, 323 and 423, respectively, within the generally elongated first portions thereof, as shown in FIGS. 9, 11 and 13, for maintaining the axial position of the shaft means relative to the handle means. Further, the several different shaft means designs which are disclosed can also have application with other types of latches as well, such as pawl latches. It is understood, therefore, that this invention is not limited to the particular embodiments disclosed, but it is intended to cover all modifications which are within the scope and spirit of the invention as defined by the appended claims.

What is claimed is:

1. A latch assembly for mounting in an aperture formed in a first member adapted for releasably retaining the first member against a corresponding second member and in a latched position, the latch assembly comprising a handle member adapted for pivotal rotation;

a shaft pivotally engaging the handle member, the shaft defining a generally elongated first portion substantially perpendicular to a second portion, with the second portion being in pivotal engagement with the handle member, wherein the handle member is pivotally rotatable relative to the second portion of the shaft, with the handle member being adapted to facilitate axial movement of the shaft by the pivotal engagement of the handle member and the second portion of the shaft as the handle member is pivotally rotated between opened and closed positions;

latching means associated with the shaft adapted for axial movement corresponding with movement of the shaft, the latching means being adapted for releasably retaining the second member in engagement with the first member in the closed position of the handle member; and retaining means associated with the shaft adapted for securing the latching means in association with the shaft for releasably retaining the latched position of the latch assembly;

the latch assembly further including means between and engaging the handle member and the second shaft portion to provide sufficient drag upon the second shaft portion for both preventing free pivotal rotation of the shaft relative to the handle member upon mounting in the aperture of the first panel member, and allowing pivotal rotation of the shaft relative to the handle member when the shaft and handle member are mounted in the aperture of the first panel member for operation of the latch assembly.

2. A latch assembly according to claim 1, wherein the handle member comprises an inner and an outer surface defining a top wall having a first end and a second end, a pair of substantially parallel side walls extending from the top wall, and a front wall extending from the top wall and engaging the side walls, wherein the engagement means comprises at least one member extending outward from the inner handle surface.

3. A latch assembly according to claim 2, wherein the engagement means comprises a pair of members extending outward from the inner surface of the handle.

4. A latch assembly according to claim 2, wherein the at least one member comprises a substantially elongated boss having a first end and a second end.

5. A latch assembly according to claim 4, wherein the substantially elongated boss is ramped generally outward in a direction from the first end toward the second end.

6. A latch assembly according to claim 2, wherein the at least one member extends outward from the inner surface of the top wall.

7. A latch assembly according to claim 6, wherein the handle member further includes a bottom wall substantially parallel the top wall and engaging the side walls and the front wall, wherein the at least one member when the shaft is installed with the handle member is adapted to urge the shaft in a direction of the bottom wall.

8. A latch assembly according to claim 1, wherein the latching means comprises a bushing member provided between the retaining means and the first member when the latch assembly is mounted therein, wherein as the first and second members are latched together, the bushing member is adapted for being temporarily deformed by axial movement of the retaining means when the handle member is pivoted to its closed position, whereby the bushing member engages an inner surface of the second member for releasably retaining the first and second members when in the latched position.

9. A latch assembly according to claim 6, wherein the second shaft portion defines a first end, a second end, and a body connecting the first and second ends thereof, wherein the at least one member extending outward from the inner handle surface engages the body of the second shaft portion.

10. A latch assembly according to claim 9, wherein the second shaft portion comprises a substantially elongated member.

11. A latch assembly according to claim 10, wherein the substantially elongated member comprises a pin member having its first and second ends being disposed within opposing apertures in the sidewalls of the handle member.

12. A latch assembly according to claim 10, wherein the substantially elongated member pivotally engages the handle member independent of the first and second ends thereof.

13. A latch assembly according to claim 12, wherein the latching means and retaining means are associated with the shaft subsequent to insertion of the shaft through the aperture in the first member.

14. A latch assembly according to claim 1
wherein the handle member comprises an inner surface and an outer surface and includes a top wall having a first end and a second end, a pair of substantially parallel side walls extending from the top wall, a front wall extending from the first end of the top wall and engaging the side walls, and a bottom wall substantially parallel the top wall and engaging the side walls and front wall, the handle member further including a generally elongated aperture extending therethrough from the inner surface to the outer surface and provided through a portion of the front wall and a portion of the bottom wall, wherein the generally elongated aperture includes a first end provided through the front wall and a second end provided through the bottom wall, wherein the generally elongated first portion of the shaft when mounted extends through the generally elongated aperture, with a position of the generally elongated first shaft portion within the generally elongated aperture corresponding with the pivotal rotation of the handle member between its opened and closed positions, whereby when the handle member is in the opened position, the generally elongated first shaft portion is proximate the first end of the generally elongated aperture and when the handle member is in the closed position the generally elongated first shaft portion is proximate the second end of the generally elongated aperture;

wherein the handle member further includes a back wall substantially parallel the front wall and engaging the bottom wall and side walls, the back wall including an aperture therethrough substantially aligned with the portion of the generally elongated aperture extending through the front wall, wherein the generally elongated first portion of the shaft includes a first end distal the second portion of the shaft, wherein on installation in a first direction with the handle member, the first end of the generally elongated first portion of the shaft is positioned in front of the second shaft portion and inserted in a direction from the second end of the top wall to the first end of the top wall, with the first end of the generally elongated first portion of the shaft being inserted first through the aperture extending through the back wall and then through the portion of the generally elongated aperture extending through the front wall, and the second shaft portion being inserted through the aperture extending through the back wall and then into engagement with the inner surface of the handle member proximate the generally elongated aperture through the front wall when the shaft is mounted.

15. A latch assembly according to claim 14, wherein the aperture extending through the back wall is sufficiently configured for allowing passage therethrough of the second shaft portion and the portion of the generally elongated aperture extending through the front wall is sufficiently configured for not allowing passage therethrough of the second shaft portion.

16. A latch assembly according to claim 15, wherein the second shaft portion when mounted engages at least the inner surface of the front wall and the inner surface of the bottom wall as the handle member is pivoted between its opened and closed positions.

17. A latch assembly according to claim 1
wherein the handle member comprises an inner surface and an outer surface and includes a top wall having a first end and a second end, a pair of substantially parallel side walls extending from the top wall, a front wall extending from the first end of the top wall and engaging the side walls, and a bottom wall substantially parallel the top wall and engaging the side walls and front wall, the handle member further including a generally elongated aperture extending therethrough from the inner surface to the outer surface and provided through a portion of the front wall and a portion of the bottom wall, wherein the generally elongated aperture includes a first end provided through the front wall and a second end provided through the bottom wall, wherein the generally elongated first portion of the shaft when mounted extends through the generally elongated aperture, with a position of the generally elongated first shaft portion within the generally elongated aperture corresponding with the pivotal rotation of the handle member between its opened and closed positions, whereby when the handle member is in the opened position, the generally elongated first shaft portion is proximate the first end of the generally elongated aperture and when the handle member is in the closed position the generally elongated first shaft portion is proximate the second end of the generally elongated aperture;

wherein the top wall of the handle member includes an aperture therethrough proximate the first end thereof and substantially aligned with the portion of the generally elongated aperture extending through the bottom wall, wherein the generally elongated first portion of the shaft includes a first end distal the second portion of the shaft, wherein on installation in a first direction with the handle member, the first end of the generally elongated first portion of the shaft is positioned in front of the second shaft portion and inserted in a direction from the outer surface of the top wall to the inner surface of the top wall, with the first end of the generally elongated first portion of the shaft being inserted first through the aperture through the top wall and then the portion of the generally elongated aperture extending through the bottom wall, and the second shaft portion being inserted through the aperture through the top wall and then into engagement with the inner surface of the handle member proximate the generally elongated aperture extending through the bottom wall when the shaft is mounted.

18. A latch assembly according to claim 17, wherein the aperture extending through the top wall is sufficiently configured for allowing passage therethrough of the second shaft portion and the portion of the generally elongated aperture extending through the bottom wall is sufficiently configured for not allowing passage therethrough of the second shaft portion.

19. A latch assembly according to claim 18, wherein the second shaft portion when mounted engages at least the inner surface of the bottom wall and the inner surface of the front wall as the handle member is pivoted between its opened and closed position.

20. A latch assembly according to claim 1 wherein the shaft and handle member further include containment means for preventing possible disassembly of the shaft and the handle member subsequent to installation of the shaft with the handle member, but prior to mounting of the shaft with the latching means and the retaining means, wherein the handle member includes an inner surface and an outer surface and includes a top wall having a first end and a second end, a pair of substantially parallel side walls extending from the top wall, a front wall extending from the first end of the top wall and engaging the side walls, a bottom wall substantially parallel the top wall and engaging the side walls and front wall, and a back wall substantially parallel the front wall and engaging the bottom wall and side walls, the handle member further including a first aperture extending therethrough from the inner surface to the outer surface provided at least through a portion of the front wall, the handle member also including a second aperture extending through the back wall and substantially aligned with the first aperture extending through the portion of the front wall, wherein the generally elongated first portion of shaft includes a first end distal the second portion of shaft, wherein on installation in a first direction with the handle member, the first end of the generally elongated first portion of the shaft is positioned in front of the second shaft portion and inserted in a direction from the second end of the top wall to the first end of the top wall, with the first end of the generally elongated first portion being inserted first through the second aperture through the back wall and then through the first aperture extending through the front wall, and the second shaft portion being inserted through the second aperture extending through the back wall, with the first aperture extending through the front wall being sufficiently configured for not allowing passage therethrough in the first direction of the second shaft portion for installation of the shaft with the handle member, wherein the containment means prevents possible disassembly of the shaft and the handle member as a result of movement of the shaft in a second direction opposite that of the first direction for installation.

21. A latch assembly according to claim 20, wherein the containment means comprises at least one shoulder member disposed on the inner surface of the top wall adapted for engaging at least one boss member disposed on the shaft.

22. A latch assembly according to claim 21, wherein the at least one shoulder member includes at least one stepped section thereon adapted for providing an upwardly extending wall for engaging the at least one boss provided on the shaft in response to movement thereof in the second direction.

23. A latch assembly according to claim 21, wherein the top wall and the bottom wall are separated by a specified distance and at least a portion of the second shaft portion proximate the boss and extending between the top wall and the bottom wall on installation includes a diameter generally greater than the specified distance of separation between the top wall and the bottom wall.

24. A latch assembly according to claim 23, wherein the bottom wall is sufficiently flexible for allowing passage of the shaft during installation in the first direction, and sufficiently rigid for preventing passage of the shaft in the second direction opposite that of the first direction.

25. A latch assembly according to claim 24, wherein the shaft includes a pair of diametrically opposing bosses extending outward from the generally elongated first shaft portion proximate the second portion thereof, wherein the second boss is adapted to engage the bottom wall.

26. A latch assembly according to claim 25, wherein the bottom wall includes therein an aperture substantially corresponding in configuration with the boss of the shaft.

27. A latch assembly according to claim 20, wherein the shaft when installed is free to move within the handle member.

* * * * *